United States Patent [19]

Hsu

[11] Patent Number: 4,858,593
[45] Date of Patent: Aug. 22, 1989

[54] SOLDERING TOOL

[76] Inventor: David Hsu, 801 Cheng Fong Bldg. No. 125, Sec. 3, Roosevelt Road, Taipei, Taiwan

[21] Appl. No.: 220,516

[22] Filed: Jul. 18, 1988

[51] Int. Cl.$^4$ ............................................... B23K 3/02
[52] U.S. Cl. ..................................... 126/414; 126/413
[58] Field of Search ............... 126/414, 413, 404, 409; 431/328, 354; 222/2; 228/51

[56] References Cited

U.S. PATENT DOCUMENTS

| 4,119,088 | 10/1978 | Sim | 126/413 |
| 4,133,301 | 1/1979 | Fujiwara | 126/413 |
| 4,374,528 | 2/1983 | Tittert | 126/409 X |
| 4,641,632 | 2/1987 | Nakajima | 126/413 |

Primary Examiner—Randall L. Green
Attorney, Agent, or Firm—Bucknam and Archer

[57] ABSTRACT

The invention provides a portable soldering tool which eliminates the drawbacks such as unsteady heating and high fuel consumption of the conventional tools known heretofore. Essentially the soldering tool comprises a housing serving as a handle, wherein a gas tank, a gas duct with flow regulating means are housed. A tip assembly having a catalytic combustion element wrapped as the heating medium is connected to the front end of the housing, to be heated by the gas after it is mixed with air. An air-gas mixing chamber is provided at the end of the duct where the tip assembly is connected, the chamber being dome shaped and the flow regulator having dual assemblies including a needle valve and a nozzle both implemented with devices to retard the flow.

4 Claims, 3 Drawing Sheets

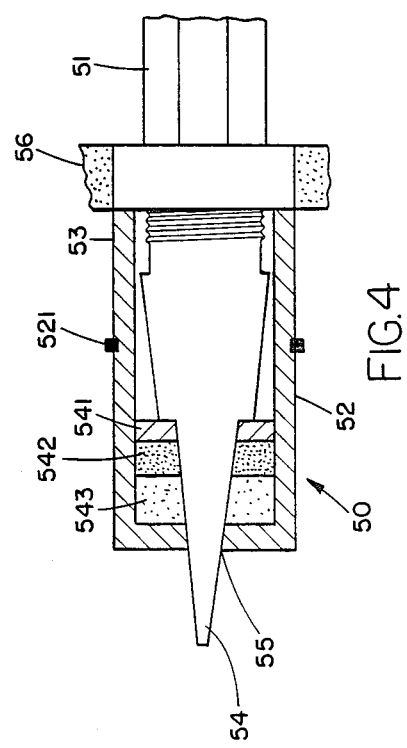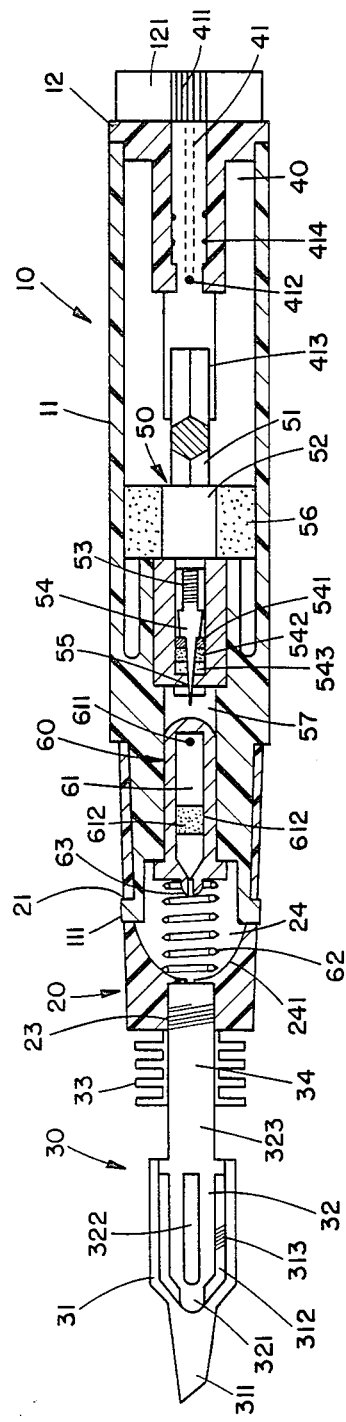

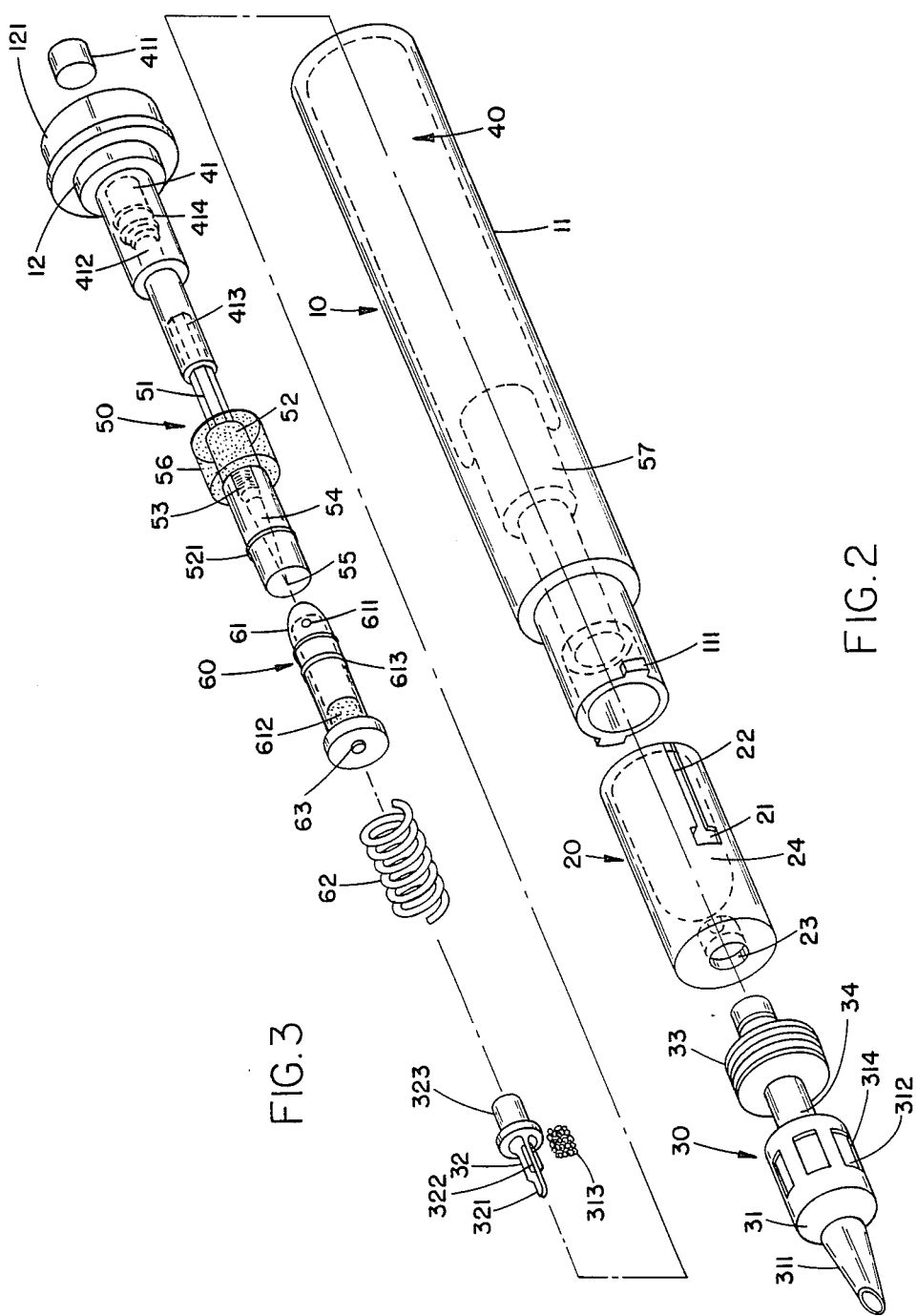

SOLDERING TOOL

The present invention relates to soldering tools and more particularly to a gas powered soldering tool wherein the heat of the soldering tip is supplied through a solid ceramic catalyst combustion element.

Soldering tools of this type are known, in which usually gas is introduced and burnt adjacent the catalytic element, to bring up the tip to an operating temperature. The flame is then extinguished to leave only sufficient amount of heat to keep the subsequent operation of the tip. Lately a catalytic carrying material of permeable nature has been adopted to make the diffusion of gas supply easier. However, the regulation of the gas stream usually is not smoothly conducted so that a considerable amount of gas fuel is wasted during the non-operational period of the tip, otherwise the gas has to be shut off and re-ignited from time to time, making the operation tedious.

The most commonly seen disadvantage of this type of soldering tool, resides in addition to the above, in the incomplete mixing of gas and air since the structure of the mixing chamber is not well shaped, so that even at a later stage, the air-gas mixture is distributed through a manifold, and this does not help the combustion.

Soldering tool such as disclosed in U.S. Pat. No. 4,133,301 comprises a soldering tip connected to a gas catalytic combustion element, wherein the gas catalytic combustion element is permeable and a manifold delivers fuel gas to the gas catalytic combustion element. The catalytic element extends around the manifold and a plurality of radial holes extends through the manifold delivering fuel gas to the element.

There is further disclosed in U.S. Pat. No. 4,133,301 a structure in which a handle portion extends from the manifold, the handle portion being formed by a housing which houses means for mixing air with the fuel gas, means for isolating the fuel gas for the catalytic element and means for regulating the flow of the fuel gas.

In European Patent Publication No. 0118 282 a soldering tool is disclosed comprising a soldering tip having a tip portion and a housing extending rearwardly from the tip portion providing a combustion chamber in which a catalytic element is located, and manifold means to supply the fuel in the catalytic element to heat the soldering tip, and characterized in that the tip is carried solely by an internal support which extends from the tip portion through the combustion chamber to the fuel supply means, the internal support acting to distribute fuel to the catalytic element and to conduct heat from the combustion chamber into the soldering tip portion.

This European Patent Publication further describes that the support is carried on a fuel supply pipe which acts to connect tip and combustion chamber to a body, and the tool comprises a handle portion being formed by the housing which houses means for mixing air with the fuel gas, means for isolating the fuel gas from the catalyst element and means for regulating the flow of the fuel gas.

In this publication, a regulator controls the flow of gas, an isolating valve being provided by a disc seal closing an orifice. The disc seal is mounted on a carrier which is operable through a camming member by a thumb operated slider. Gas flows through the carrier and is mixed with air at an outlet. Orifices in the handle deliver the air into the outlet. A tube delivers the air/gas mixture into the manifold.

It can clearly be seen, that the flow regulation through the devices of the prior art is quite complicated and unsatisfactory, and consequently the heating of the tip can hardly be performed and the economy of the fuel consumption cannot be achieved.

The main object of the present invention is to provide a portable soldering tool have a dual stage flow regulating means including a knob operated needle valve and a spring biased nozzle. The gas pressure discharged from the nozzle is just right for mixing with the air entering the housing to give a most effective and economical mixture.

Another object of the present invention is to provide a dome shaped mixing chamber to avoid the incomplete mixing due to the stray of gas stream discharge from the nozzle and to gather every trace of gas into complete contact with air to assure a perfect mixing.

A further object of the present invention is to provide an auxiliary means for regulating the gas flow to avoid an abrupt change of pressure at the exit of the needle valve and the nozzle by utilization of a series of baffling and buffering means throughout the gas passage.

A still further object of the present invention is to provide a simplified structure of the components to ease the assembling of the entire tool and to obtain a trouble free and less expensive tool.

Other objects and features of the present invention will be apparent through a detailed description accompanying the annexed drawings, of which:

FIG. 1 is a partial sectional view of a side elevation of a preferred embodiment of the soldering tool of the present invention;

FIG. 2 is a partial sectional perspective exploded view of the housings and the tip assembly of the embodiment of FIG. 1;

FIG. 3 is a partial sectional perspective exploded view of the inner mechanism and parts thereof relating to the embodiment of FIG. 1;

FIG. 4 is a schematic drawing showing a profile of the needle valve having a buffering function;

Figure 5:
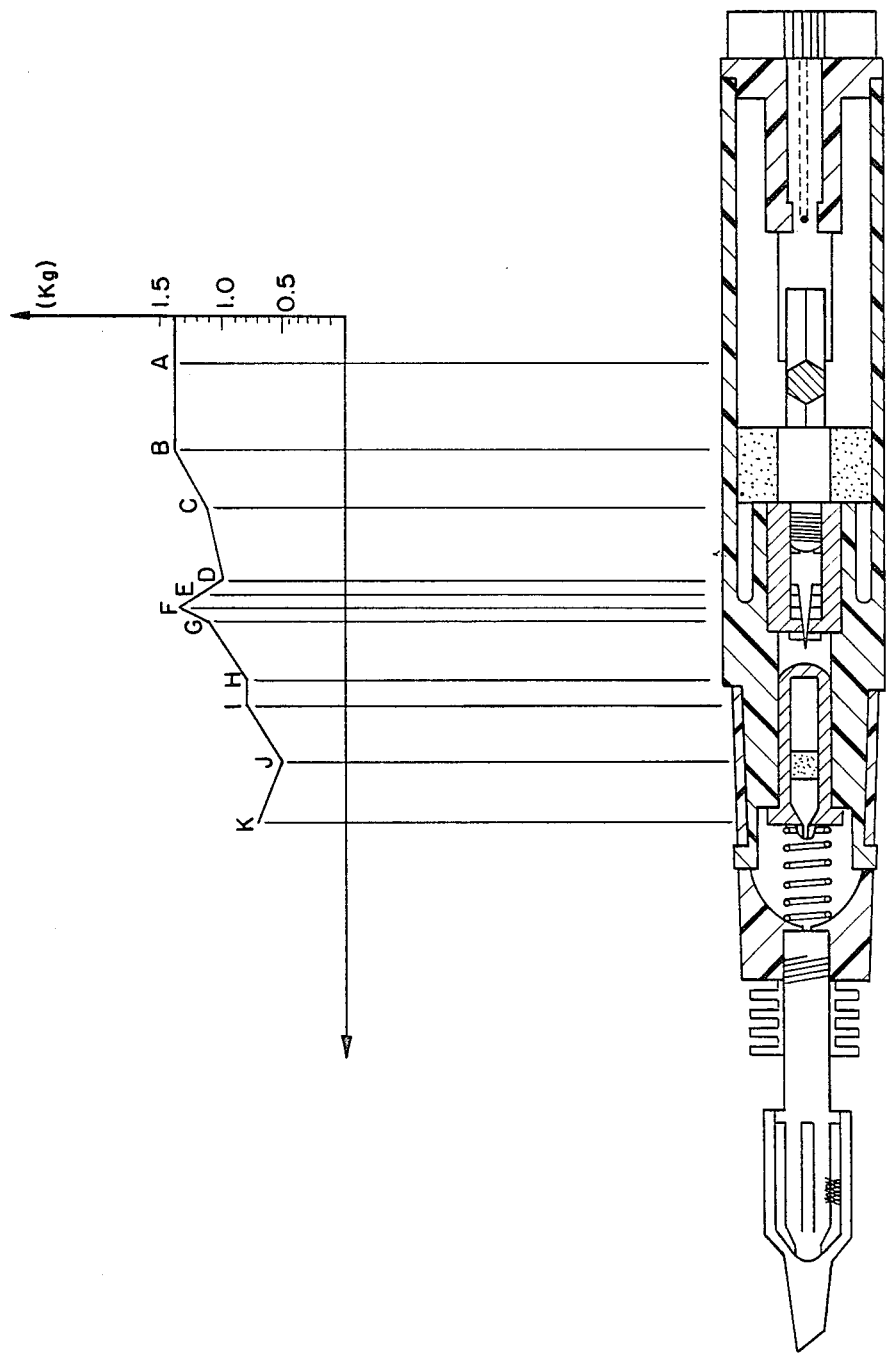
FIG. 5 is a diagram showing the pressure gradient of the fuel from the upstream or rear end where the fuel tank is located to the front or downstream end where the soldering tip is disposed.

Now referring to FIGS. 1 to 3 for a detailed description by way of a preferred embodiment, the soldering tool of the present invention comprises a rear housing 10, and a front housing 20, which are joined together to form the handle of the tool. A soldering tip assembly 30 having its threaded rear end screwed into a front end opening 23 of the front housing 20 is provided to complete the connection between them.

Extending forward from the threaded rear end, the tip assembly 30 has around its tubular stem 34 a plurality of circular fins 33 for cooling purposes when the soldering tool is in use. To the front end of stem 34, the tubular rear end 323 of a heating element 32 is inserted. The heating element 32 has a gas distributing opening 322 shaped more or less like a diamond which communicates with a longitudinal passage in the end 323. Further ahead of the heating element 32, a projection 321 is formed integrally thereon to stick into a front recess in the tip casing 31 which encloses closely the heating element 32 to assure a good heat conduction when the element 32 is heated through the combustion of gas.

A noble metal loaded ceramic fiber product in the name of ZIRCAR ® is used to wrap around the heating element 32. Zircar, a product of Zircar Products, Inc. Florida, New York 10921, is available in the form of a mat, constituting Fiber of Quartz (Sio$_2$) of a-12 mm$\phi$, 20 mm length containing 5 wt % catalyst (Pt). The type adopted here is of ZCM-4 having a thickness of 2.5 mm (0.1 in.) with 50 wt % organic binder.

The tip assembly 30 is connected to the front (downstream) end of the front housing 20 with threaded couple 34-23. The front housing 20 has air-fuel mixing chamber 24 with a dome 241 formed therein which will be discussed further. The cylindrical front housing 20 has a clip retaining opening 21 to engage with a rectangular clip 111 at the front end of the rear housing 10. An air supplying split 22 extends longitudinally from the opening 21 to the rear edge of the front housing 20. The split 22 serves to supply air to the mixing chamber, so that radiant arranged air supply bores in the conventional tools can be eliminated. On the other hand, the split 22 eases the insert of the rear housing 10 into the front housing 20, so that the clip 111 can slip into the opening without difficulty.

The rear housing 10 comprises from its rear end to the front a hollow space that is the fuel tank 40. The fuel gas used is butane such as used in the cigarette lighter, which is to be filled in from a filling valve 411 located at the rearmost end of the housing 10 and which will be described later.

In the front end of the gas tank 40 there is a duct 57 provided for retaining a dual flow controlling assembly including from the rear to the front, a needle valve assembly 50 and a nozzle assembly 60, fuel gas passing through these two assemblies to enter into the mixing chamber 24 to be mixed with air supplied from the split 22.

The gas flow controlling assemblies 50 and 60 will now be described. Fitted tightly against the rear housing wall 11 is a regulator seat 12 which has a regulator knob 121 which is rotatable to actuate a filling and regulating stem 41 fitted tightly therein. The filling valve 411 is located in the center of the knob 121. The seat 12, knob 121 as well as the front and rear housings 20, 10 are all made of suitable plastic materials. The remaining components including the regulating stem 41, the needle valve assembly 50, the nozzle assembly 60 are all made of brass unless otherwise specified.

Filling and regulating stem 41 are mounted within the regulator seat 12 and are operable by the knob 121, in the center of which the filling valve 411 is located.

The filling and regulating stem 41 with a couple of O rings serves as gas seal provided between the stem and the wall of the seat 12. The filling stem 41 is channeled from the filling valve 411 to a laterally disposed inlet hole 412 on a reduced diameter portion of the stem, to communicate with the gas tank 40. A regulator socket 413 forms an hexagonal recess at the front end of the stem 41 to take a regulating shaft 51 of hexagonal section at the rear end of a needle valve assembly 50 which is inserted into the rear portion of the duct 57.

With reference to FIG. 4 the needle valve assembly 50 is shown. At the rear entrance of the duct 57 where the inside diameter is somewhat greater than that of the front part of the duct 57, the needle valve assembly 50 with its valve block 52 is inserted into the rear entrance of the duct 57 with O ring 521 there-between to ensure gas tightness. The needle valve assembly having its shaft 51 rotated by the knob 121 through socket 413 is advanced or retracted by way of the thread 53 within the block 52, so that the needle 54 is used to close or open the valve opening 55 gradually. Within the valve block, between the needle 54 and its rear greater diameter portion, there are provided from the rear to the front successively a baffle plate of copper 541, a buffer sponge ring 542, a dispersing sponge ring 543. These rings 542, 543 serve to further restrict the flow of gas discharged from the needle valve opening 55, and the copper plate 541 serves to hold the sponge rings. Upstream of these sponge rings, another sponge ring 56 of greater thickness is provided at the rear end of the valve block 52, which ring is located upstream of the valve assembly 50 so as to ease the surge of the gas from within the tank 40 into the needle valve.

At the front or downstream end of the duct 57, wherein the inside diameter is somewhat smaller than the rear part thereof, a nozzle assembly 60 with O rings 613 serve the same purpose of gas sealing. A lateral hole 611 is disposed at the rear of the nozzle assembly 60 to communicate with the inner channel 61 until it reaches the front end of the assembly 60 where a nozzle 63 is located. Within the channel 61, a filter 612 of metallurgical powder also may slow up the rate of flow. The nozzle assembly 60 with its front flange rests against the shoulder at the front end of the duct 57 and a helical spring 62 keeps it in position. The nozzle 63 is aligned with discharge opening 23 which communicates with the gas distributor 32 inside the tip assembly 32.

The dome shaped mixing chamber ensures a thorough mixing of gas from the nozzle 63 and air from the split 22. Possible deviation in the orientation of nozzle 63 would result in a stray of gas stream. However, the dome shaped chamber will give a compensation and would guide the astray stream to be mixed completely and passing through the opening 23 finally. This is a special feature of the present invention which has never been seen heretofore in any prior art.

The effectiveness of the provision of the dual controlling assemblies including a needle valve and a nozzle with implementation of flow retarding facilities such as sponge 56, 542, 543 outside and inside the needle valve and the metallurgical powder filter 612 in the nozzle assembly are seen in the diagram of FIG. 5. Gas pressures are measured at points starting from gas tank 40 to the discharge point of the nozzle 63. At points where the retarding measures are taken, a pressure build-up results which means that the speed of flow is hampered and surge of gas can be prevented and consequently, the supply of the gas into the mixing chamber is at a comparatively steady rate and less waste is caused.

The mixed gas-air is supplied through the distributor 32 to ignite the catalytic combustion element 313 and keep the heating conductor or tip of the distributor 32 hot so that the soldering tip can perform its function properly.

The route of the gas supply is once more traced as follows: filling valve 411 - inlet hole 412 - tank 40 - sponge 56 - needle valve thread 53 - buffering sponge 542 - dispersing sponge 543 - valve opening 55 - inlet hole 611 of nozzle assembly 60 - metallurgical powder filter 612 - nozzle 63. This route covers mainly the components indicated in FIG. 5. After burning, the exhaust gas is discharged through at least one exhaust opening 314.

The present invention is described through a preferred embodiment but by no means a limitation. Changes and variations will be clear to those skilled in the art without departing from the spirit and scope of the invention.

I claim:

1. A gas powered soldering tool comprising a housing serving as a handle, said housing having a front end (20) and a rear end (10), a tip assembly (30) connected to the front end of said housing, said tip assembly having a front end and a rear end, a heating element (52) inserted in the front end of said tip assembly, a dome-shaped air-gas mixing chamber (24) located in said front end of said housing, a gas tank (40) located in the rear end of said housing, said gas tank having a duct (57) at the front end thereof, said duct retaining a dual flow controlling assembly, said dual flow controlling assembly including a needle valve (50) and a nozzle assembly (60), the gas flowing from said gas tank through said needle assembly and said nozzle assembly to said air-gas mixing chamber, an air inlet (22) in the rear of said front housing for supplying air to the mixing chamber, a catalytic combustion element (313) being wrapped around said heating element.

2. Soldering tool according to claim 1, wherein the needle valve is located upstream of said nozzle assembly and has a valve block (52) and a valve opening, said valve block is inserted in the rear end of said duct (57), said duct communicating said gas tank to said dome shaped mixing chamber, the needle valve is threaded forward or rearward by means of a regulating stem (41), a rotatable knob (121) provided at the rear end of the housing to close or open the valve sponge means (542,543, 56) are located at the rear of the valve block and adjacent to the valve opening, said needle valve being operated by said rotatable knob located in the rear of said valve block to retard the gas flow rate.

3. Soldering tool according to claim 2, wherein said nozzle assembly is disposed within the front downstream end of said duct and has a lateral inlet hole (611) at the rear of said nozzle assembly to take gas discharged from said needle valve upstream thereof, said nozzle assembly has an inner channel (61), a metallurgical powder filter (612) is provided within said channel to retard the rate of the gas flow.

4. The soldering tool according to claim 1, wherein the tip assembly has a distributor-heater with a diamond shaped gas incoming hole and is heated through said catalytic combustion element wrapped thereon, at least one exhaust opening is provided in the tip assembly.

* * * * *